US011606725B2

(12) United States Patent
Yoon (10) Patent No.: US 11,606,725 B2
(45) Date of Patent: Mar. 14, 2023

(54) WIRELESS BAND PRIORITY METRICS ANALYSIS AND RESPONSE

(71) Applicant: T-Mobile USA, Inc., Bellevue, WA (US)

(72) Inventor: Jong Sung Yoon, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 14 days.

(21) Appl. No.: 17/467,708

(22) Filed: Sep. 7, 2021

(65) Prior Publication Data

US 2021/0410014 A1    Dec. 30, 2021

Related U.S. Application Data

(62) Division of application No. 16/664,609, filed on Oct. 25, 2019, now Pat. No. 11,140,582.

(51) Int. Cl.

| | |
|---|---|
| *H04W 28/20* | (2009.01) |
| *H04W 24/02* | (2009.01) |
| *H04W 16/10* | (2009.01) |
| *H04W 24/08* | (2009.01) |
| *H04W 36/00* | (2009.01) |
| *H04W 64/00* | (2009.01) |
| *H04B 17/309* | (2015.01) |
| *H04W 72/10* | (2009.01) |
| *H04W 24/10* | (2009.01) |

(52) U.S. Cl.
CPC .......... *H04W 28/20* (2013.01); *H04B 17/309* (2015.01); *H04W 16/10* (2013.01); *H04W 24/02* (2013.01); *H04W 24/08* (2013.01); *H04W 24/10* (2013.01); *H04W 36/0072* (2013.01); *H04W 64/003* (2013.01); *H04W 72/10* (2013.01)

(58) Field of Classification Search
CPC ..... H04W 16/10; H04W 24/02; H04W 24/08; H04W 24/10; H04W 28/20; H04W 36/0072; H04W 64/003; H04W 72/10
See application file for complete search history.

(56) References Cited

U.S. PATENT DOCUMENTS

| | | | | |
|---|---|---|---|---|
| 8,055,295 | B1* | 11/2011 | Khanka | H04W 72/06 455/552.1 |
| 2002/0027891 | A1 | 3/2002 | Mimura | |
| 2013/0010719 | A1* | 1/2013 | Shapira | H04W 72/082 370/329 |

(Continued)

*Primary Examiner* — Raymond S Dean
(74) *Attorney, Agent, or Firm* — Lee & Hayes, P.C.

(57) ABSTRACT

User equipment (UE) can include a network analyzer to capture network metrics to monitor conditions of cell coverage and band dominance. In some instances, the UE is served by a base station with multiple network bands. The base station may select a network band based on an optimization scheme. In some instances, the UE can capture data representing network metrics and can report such data to a network device to further aggregate the data and to generate reports. The network device can use the aggregated data to perform band dominance analysis, which may include determining a coverage index for each available band. The coverage index may be used to determine parameters for a base station. The parameters may be modified to trigger handovers to optimize band traffic.

20 Claims, 6 Drawing Sheets

(56) References Cited

U.S. PATENT DOCUMENTS

| | | | |
|---|---|---|---|
| 2014/0031042 A1* | 1/2014 | Smiley | H04W 24/02 455/438 |
| 2014/0376514 A1* | 12/2014 | Wong | H04W 36/0022 370/331 |
| 2015/0126205 A1 | 5/2015 | Kim et al. | |
| 2015/0208420 A1 | 7/2015 | Kashiwase et al. | |
| 2017/0164177 A1 | 6/2017 | Wang et al. | |
| 2018/0262903 A1* | 9/2018 | Ryan | H04W 4/90 |
| 2019/0082497 A1* | 3/2019 | Friedmann | H04L 5/0096 |
| 2019/0124659 A1* | 4/2019 | Wang | H04W 76/18 |
| 2021/0127303 A1 | 4/2021 | Yoon | |

* cited by examiner

WIRELESS BAND PRIORITY METRICS ANALYSIS AND RESPONSE

CROSS REFERENCE TO RELATED APPLICATIONS

The present disclosure is a division of, and claims priority under 35 U.S.C. § 120 to, U.S. patent application Ser. No. 16/664,609, filed Oct. 25, 2019, the entire disclosure of which is hereby incorporated by reference in its entirety.

BACKGROUND

Modern telecommunication systems include heterogeneous mixtures of second, third, fourth, and fifth generation (2G, 3G, 4G, 5G) cellular-wireless access technologies, which may be cross-compatible and may operate collectively to provide communication services. Global Systems for Mobile (GSM) is an example of 2G telecommunications technologies; Universal Mobile Telecommunications System (UNITS) is an example of 3G telecommunications technologies; Long Term Evolution (LTE), including LTE Advanced, Evolved High-Speed Packet Access (HSPA+) are examples of 4G telecommunications technologies; and New Radio (NR) is an example of 5G telecommunication technologies.

To provide coverage for multigenerational wireless communication technologies, cell towers may include functionality to broadcast in different frequency bands. To optimize the use of the frequency bands, a network provider may gather network data to adjust band utilization based on band dominance and land features. However, it can be difficult to gather network data for in-building space or vast rural space. Network providers can commission drive testing, which often includes vehicle-based testing equipment to gather network data. However, such drive testing can be limited to testing on roads, can provide limited information, and can be prohibitive in terms of cost and time.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems, devices, and methods are directed to user equipment including a network analyzer to capture network metrics, and a network device for analyzing the network metrics to perform band dominance analysis. The band dominance analysis may be used to determine a band priority for determining a connection for the user equipment. To initiate a communication connection, the user equipment connects to a base station (network cell) using a network band. The network band can be one of multiple network bands available at the base station. In some instances, the base station can associate a first network band with a higher priority and/or utilization than a second network band.

To further optimize the use of network bands, the base station can assign different priorities to different network bands based on a location feature. The location feature may include an altitude, a user density, an urban region, a suburban region, a rural region, or a type of building. In some instances, an example band optimization scheme may include load balancing traffic between the available bands while trying to reserve a specific band range for user devices that are located inside buildings. For instance, band range with lower frequency signals have better penetration and may pass through natural and/or man-made obstacles, such as walls, with less attenuation. This effect results in better in-building penetration. Moreover, lower-frequency signals propagate farther in the environment than higher-frequency signals, given similar conditions. Accordingly, the example band optimization scheme may set bands with higher frequency as a high priority band, to increase the use of the high frequency bands where it works, thus reserving the option of using lower frequency bands in locations where lower frequency might be better.

However, if there are many active mobile users at the same time and location on the same band, the signal quality may decrease. Accordingly, the example band optimization scheme may also include a load balancing scheme to transition the traffic from the congested band to a different band with lower traffic.

In some instances, a service provider may provide a network analyzer to continuously capture network metrics at the user equipment to facilitate identification of network conditions at a coverage area and to optimize utilization of available bands at the cell locations. In some instances, the user equipment can capture network metrics which can be provided to a network device associated with the service provider to determine aggregated network metrics. The network device can use the aggregated network metrics to determine coverage index for the available bands and band dominance for a cell location. Based on the optimization scheme, the network device may determine whether to change one or more parameters including network metric thresholds for a base station within the cell location to trigger a handover for a user device. If the one or more handover conditions are met (e.g., network metrics that meet or exceed the network metric threshold), the user device may transition its connection to use a network band associated with a lower priority and/or utilization.

In one use case, the techniques discussed herein can be implemented on a user equipment configured to facilitate user communications using first frequency resources (network bands). In some instances, the frequency resources can include, but are not limited to, an LTE Band 12 (e.g., a 700 MHz band), an LTE Band 4 (e.g., 1700 MHz band and/or a 2100 MHz band), an LTE Band 2 (e.g., a 1900 MHz band), an LTE Band 66 (e.g., a 1700 MHz band and/or a 2100 MHz extended band), a NR Band n71 (e.g., a 600 MHz band), a UMTS Band 4 (e.g., 1700 MHz band and/or a 2100 MHz band), UMTS Band 2 (e.g., a 1900 MHz band), GSM Band 2 (e.g., a 1900 MHz band), and the like. Further, the network analyzer can be implemented as an application on the user equipment to intermittently scan second frequency resources. In some instances, the second frequency resources can include a different network band from the first frequency resources and may be transmitted from the same base station. As can be understood, the first frequency resource and the second frequency resource can include any range of wireless frequencies capable of being used to communicate data. Thus, in general, the techniques can include the user equipment using the first frequency resources for communication(s) (e.g., voice communication, data communications, etc.), and can use the network analyzer to scan the second frequency resources, without using the second frequency resources for communication(s). However, in some instances, the techniques can include utilizing the second frequency resources for communication(s), while monitoring metrics associated with the resources to determine sources of interference, for example.

In some instances, an analysis may include determining a coverage index for a first network band based on a percentage of call count using the first network band relative to total calls for a particular location. The coverage index for the first network band may then be compared to a second coverage index for a different second network band at the same location to determine a band dominancy. Based on the band dominancy, the network device may determine a coverage index threshold for a network cell in the particular location and send a command to remotely adjust the threshold for the network cell.

In some examples, the network cell may use a handover rule to determine when to trigger a handover by a transitioning a connection from using a first network band to a second network band. The parameters of the handover rule may be changed remotely by the network device to optimize band usage. In various examples, the handover rule may be based on a network metric of the current band and the target band and comparing the network metric to a network metric threshold. The network metric thresholds may include reference signal received power (RSRP) thresholds, and reference signal received quality (RSRQ) thresholds, and RSRP/RSRQ thresholds can be configured per each bearer for different Quality of Service Class Identifier (QCI) while different QCIs are used for different application types such as QCI-1 for voice calls and QCI-5 for data downloads. By adjusting the network metric threshold, the network cell may cause the user device to connect to a network band associated with a lower priority and/or utilization based on network metrics that meet or exceed the network metric threshold per communication type using its associated QCI (e.g. handovers in voice communication on QCI type 1 is controlled by one threshold set while handovers in data communication on QCI type 5 by controlled by another threshold set). The example remediation techniques are examples and additional techniques are discussed herein.

In some instances, the network analyzer can be implemented as an application or component running on the user equipment configured to interact with an operating system component of the user equipment. The network analyzer can instruct the operating system component to control software and/or hardware associated with a transceiver of the user equipment to monitor conditions at the user equipment and provide metrics (e.g., information about location, cell identifier of the serving network cell, call status, etc.) indicative of the conditions to a network server for subsequent analysis.

In examples, one or more metrics are captured and used to provide band dominance analysis. The one or more metrics captured at the time of a communication may include: the geographical location (e.g., GPS or WI-FI based location) of the user equipment (including latitude/longitude and location accuracy), a cell identifier (may also be referred to as "base station identifier") of a cell serving the user equipment, RSRP, RSRQ, RSSI, band number and a signal-to-interference-plus-noise ratio (SINR). The one or more metrics can be sent to the network device for aggregation and determination of a coverage index for individual network cell. The coverage index may be used to determine improvements on signal interference from barriers or distance, for example, to tune the band dominancy by changing the coverage index threshold, and the like.

By way of example and without limitation, the techniques discussed herein can be implemented on a user equipment configured to capture and report network metrics to a network server in response to establishing voice or data sessions with core network. In some instances, the user equipment will connect to a network band with the highest priority, even though that network band may result in lower audio quality. The network server collects the data and identifies instances where the network band is experiencing heavy band traffic and/or may be degraded by structures in a populated area. The network server may determine a band dominance for that network cell and determine to adjust a network metric threshold to cause the network cell to perform handover for the user equipment to a different network band. The network metric threshold for the network cell may be tuned, so that the user equipment may transition to a lower priority and/or utilization network band.

The systems, devices, and techniques described herein can improve a functioning of a network by capturing network metrics to adjust band dominance on network cell to reduce signal interference from heavy band traffic or from location features (e.g., inside a large mall). Increased interference may cause error in transmission and eventually retransmission of the same data. As a result, it will negatively impact the data throughput for users and it may also cause data loss if the application of the data is sensitive to delay such as voice call, resulting in degraded audio experience. For example, the systems, devices, and techniques can determine coverage index for available bands for individual cell locations to identify instances where the band utilization is not optimized for the location. Further, determining coverage index can allow network engineers to tune network metrics thresholds for individual network cell to trigger handovers to decrease signal interference. Additionally, the systems, devices, and techniques discussed herein provide a distributed framework for network analysis, which may determine updated coverage index, band dominance, and thresholds for individual network cells and may automatically and remotely send commands to tune the individual network cells. Moreover, by constantly monitoring the network and updating the coverage index, the network server may automatically and remotely send commands to retune the network cell to optimize band usage, if needed. These and other improvements to the functioning of a computer and network are discussed herein.

The systems, devices, and techniques described herein can be implemented in a number of ways. Example implementations are provided below with reference to the following figures.

Figure 1:
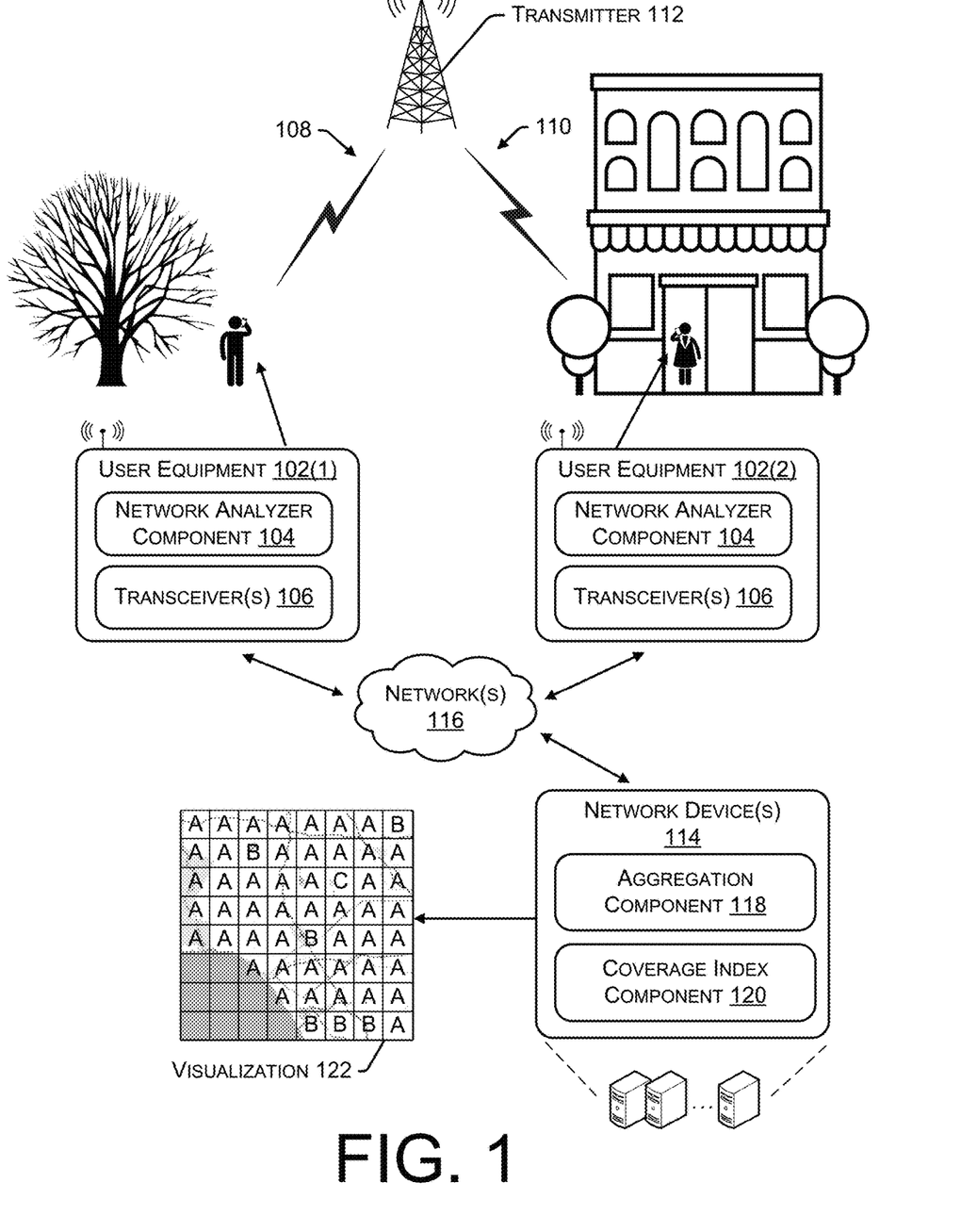
FIG. 1 illustrates an example environment including user equipment including a network analyzer to facilitate mobile collection of network metrics for band dominance analysis, as described herein.

FIG. 1 illustrates an example environment 100 including user equipment including a network analyzer to facilitate mobile collection of network metrics for band dominance analysis, as described herein.

In some instances, user equipment 102(1) and user equipment 102(2) (collectively referred to as user equipment 102) can include a network analyzer component 104 and one or more transceiver(s) 106. In general, the user equipment 102(1) and the user equipment 102(2) can receive signals 108 and 110 output by transmitter 112 to determine one or more metrics associated with the signals 108 and 110. In some instances, the transmitter 112 can represent any one-directional, two-directional, or omni-directional wireless communication transceiver.

In some instances, the one or more transceiver(s) 106 can receive the signal 108 and 110 at the user equipment 102, and the network analyzer component 104 can determine various metrics associated with the signal 108 and 110. For example, one or more signal condition metrics can include, but are not limited to, one or more of a received signal strength indication (RSSI), a reference signal received power (RSRP), a reference signal received quality (RSRQ), and a signal-to-interference-plus-noise ratio (SINR). Further, the metrics can include a channel identifier (e.g., channel 1, 2, . . . , N (where N is an integer)), a band identifier (e.g., band A, B, C, . . . 1, 2, 3, . . . , etc.) and/or an indication of a frequency associated with a channel and/or band (e.g., 617-622 MHz, 622-627 MHz, 627-632 MHz, . . . , 647-652 MHz, and the like). Of course, these frequencies are examples and other frequencies can be used depending on various implementations.

In some instances, the user equipment 102 can receive a plurality of signals, for example, by tuning one or more filters associated with the transceiver(s) 106, to isolate a specific frequency of a signal. Other techniques can be used to configure the user equipment 102 to receive a range of frequencies.

The user equipment 102 can communicate with one or more network device(s) 114 via one or more network(s) 116.

In some instances, the network device(s) 114 can include an aggregation component 118 and a coverage index component 120. The aggregation component 118 can receive one or more metrics from the user equipment 102, as well as other user equipment, and aggregate the metrics. The coverage index component 120 may use the aggregated metrics to determine band coverage and generate visualization 122. In some instances, and as discussed herein, the visualization 122 can be used, at least in part, to determine a region of interest with cells that are active and the estimated band dominance, to determine locations where cell signal may be associated with poor quality, to determine locations where band priority should be adjusted based on location features, to inform decisions regarding optimization of band utilization, and the like. As can be understood, the aggregation component 118 and the coverage index component 120 is not limited to outputting the visualization 122, and any number of visualizations or data can be utilized, as discussed herein.

Examples of the user equipment 102 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the user equipment 102 include, but are not limited to, smart devices such as televisions, refrigerators, washing machines, dryers, smart mirrors, coffee machines, lights, lamps, temperature sensors, music players, headphones, or any other electronic appliances that can generate, request, receive, transmit, or exchange voice, video, and/or digital data over a network.

In some instances, the network device(s) 114 can be implemented as one or more communication servers to facilitate communications by and between the various devices in the environment 100. That is, the network device(s) 114 can represent any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies. Thus, the network device(s) 114 may implement GSM, UMTS, LTE/LTE Advanced, and/or NR telecommunications technologies. In some instances, the telecommunication technologies can be referred to generally as a radio access technology. Thus, a 5G network can represent a 5G radio access technology.

The network device(s) 114 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user equipment 102, the network device(s) 114, and/or the network(s) 116. In some embodiments, the network device(s) 114 are operated by a service provider.

While FIG. 1 illustrates the network device(s) 114, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

Examples of the network(s) 116 can include, but are not limited to networks including second-generation (2G), third-generation (3G), fourth-generation (4G) cellular networks, such as LTE (Long Term Evolution), fifth-generation (5G) networks, and data networks, such as WI-FI networks.

In some instances, the user equipment 102 can communicate with any number of user equipment, servers, network devices, computing devices, and the like.

In the present example, the example environment 100 can illustrate an instance of network band optimization based on location feature. For example, both user equipment 102(1) and user equipment 102(2) are connected to transmitter 112, and the signal 108 and 110 may use the highest priority example band A. The example band A may be an LTE Band 4 (e.g., 1700 MHz band and/or a 2100 MHz band). In this instance of network band optimization, the user equipment 102(1) may be out in the open and user equipment 102(2) may be inside a building. The user equipment 102(2) may experience some signal degradation as result of the building walls obstructing the signal 110. This may result in a poorer user experience (e.g., audio loss) for the user of user equipment 102(2) relative to the user of user equipment 102(1). In examples, the network device(s) 114 may receive network metrics from the user equipment 102(2) indicating poor signal strength and/or quality and the network device(s) 114 may determine to adjust the network metrics threshold for the transmitter 112 to trigger a handover condition. In response to a handover condition being met, the transmitter 112 may transition the user equipment 102(2) from using example band A to an example band B. The example band B may include LTE Band 12 (e.g., a 700 MHz band), a lower frequency signal that may better pass through walls.

Figure 2:
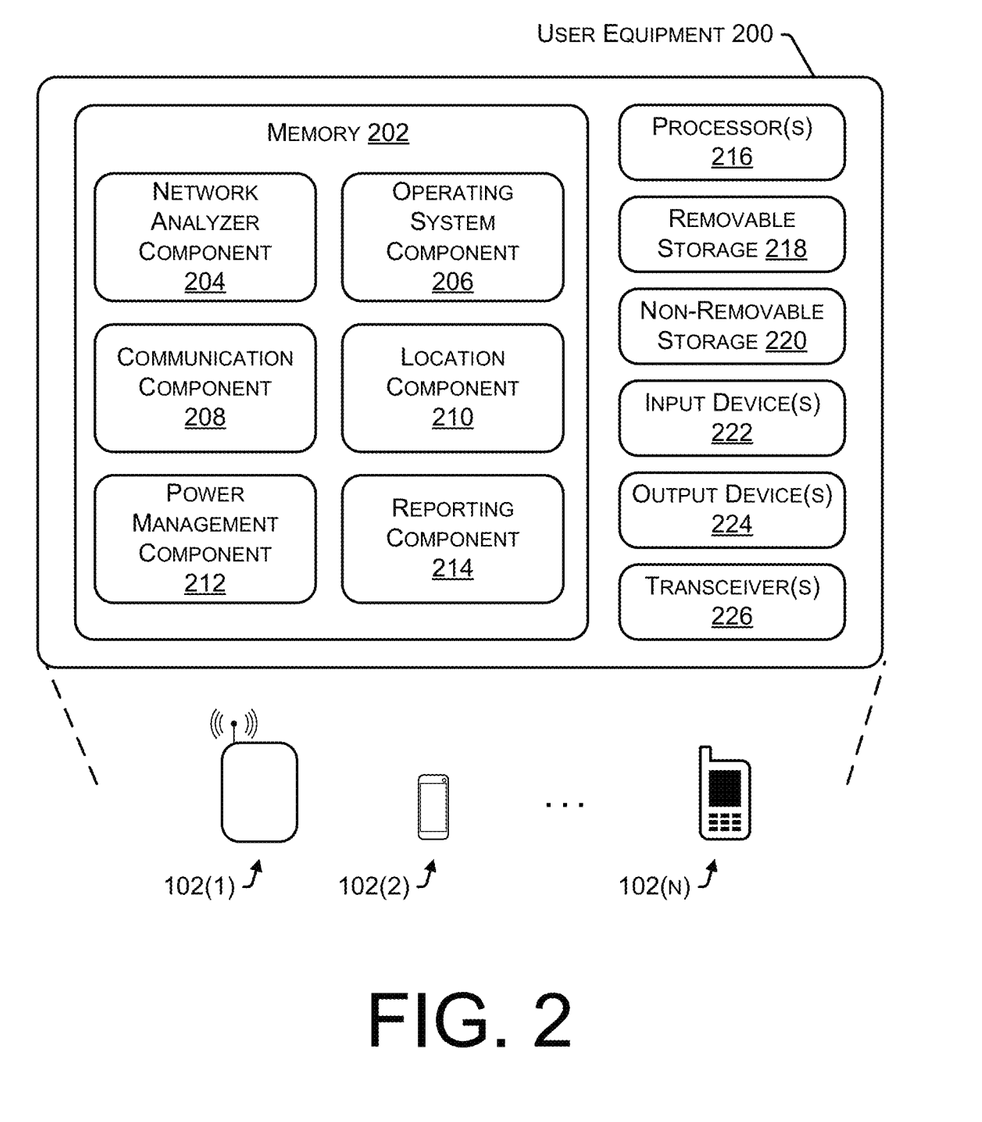
FIG. 2 illustrates an example user equipment configured to implement the network analyzer, in accordance with embodiments of the disclosure.

FIG. 2 illustrates an example user equipment 200 configured to implement the network analyzer, in accordance with embodiments of the disclosure. In some embodiments, the user equipment 200 can correspond to the user equipment 102(1) and to the user equipment 102(2) of FIG. 1. It is to be understood in the context of this disclosure that the user equipment 200 can be implemented as a single device or as a plurality of devices with components and data distributed among them. By way of example, and without limitation, the user equipment 200 can be implemented as various user equipment 102(1), 102(2), . . . , 102(N).

As illustrated, the user equipment 200 comprises a memory 202 storing a network analyzer component 204, an operating system component 206, a communication component 208, a location component 210, a power management component 212, and a reporting component 214. Also, the user equipment 200 includes processor(s) 216, a removable storage 218 and non-removable storage 220, input device(s) 222, output device(s) 224, and transceiver(s) 226.

In various embodiments, memory 202 is volatile (such as RAM), non-volatile (such as ROM, flash memory, etc.) or some combination of the two. The network analyzer component 204, the operating system component 206, the communication component 208, the location component 210, the power management component 212, and the reporting component 214 stored in the memory 202 can comprise methods, threads, processes, applications or any other sort of executable instructions. The network analyzer component 204, the operating system component 206, the communication component 208, the location component 210, the power management component 212, and the reporting component 214 can also include files and databases.

The network analyzer component 204 can include functionality to determine one or more metrics associated with a signal received, detected, or otherwise monitored by the user equipment 200. For example, the network analyzer component 204 can determine metrics including but not limited to RSSI, RSRP, RSRQ, SINR, power density, and the like for a specific bandwidth in the frequency domain. The network analyzer component 204 can instruct the operating system component to control software and/or hardware associated with a transceiver of the user equipment to monitor conditions at the user equipment and to provide metrics (e.g., information about location, network environment, call status, etc.) indicative of the conditions to a network server for subsequent analysis. In some instances, information can be associated with the metrics, such as the geographical location of the user equipment (e.g., GPS or WI-FI based location), a cell identifier of a cell serving the user equipment, a signal-to-interference-plus-noise ratio (SINR), and the like. In some instances, the information may refer to geolocation information, which may include any information associated with the location, such as an address, the location latitude, the location longitude, the location accuracy, the location altitude, the location identifier, the location area code, and the like. The network analyzer component 204 can send the metrics to a network device to aggregate and analyze the metrics.

In some instances, the network analyzer component 204 can scan a frequency resource at any regular or irregular interval or can initiate a scan based on an internal or external trigger or command. For example, the network analyzer component 204 can receive an instruction from the remote network device to initiate a scan. In some instances, the network analyzer component 204 can determine operating conditions or characteristics of the user equipment 200 (e.g., a power resource, location, etc.), and a command to initiate scanning can be based at least in part on those operating conditions or characteristics.

In some instances, the network analyzer component 204 can be implemented as an application operating on the user equipment 200. In some instances, to initiate a scan of one or more frequency resources, the network analyzer component can call an API (application programming interface) implemented in the operating system component 206, for example.

In some instances, the network analyzer component 204 can include functionality to present a user interface on the user equipment 200, for example, to receive an indication from a user enabling or disabling a network analyzer mode of the network analyzer component 204. For example, in some instances, a user of the user equipment can turn on or turn off the network analyzer component 204 based on personal preferences, incentives from a service provider, inclusion in a voluntary program, and the like.

In some instances, the network analyzer component 204 can correspond to the network analyzer component 104 of FIG. 1.

The operating system component 206 can include functionality to query a chipset of the user equipment 200, and/or to query the transceiver(s) 226, to instruct the transceiver(s) 226 and/or any software or hardware to scan one or more channels or frequency resources to determine metrics associated with the channel or frequency resources, for example. In some instances, the operating system component 206 can include a first API to receive instructions from the network analyzer component 204 and to provide data to the network analyzer component 204, and a second API to issue instructions to software or hardware associated with a modem or the transceiver(s) 226 and to receive data from such components.

The communication component 208 can include functionality to conduct communications with one or more other devices, as discussed herein. In some instances, the communication component 208 can conduct a communication via a first set of frequency resources associated with the network, while the network analyzer component 204 can scan a second set of frequency resources for a signal. In some instances, the communication component 208 can take priority over resources of the user equipment 200 to conduct a communication. That is, if the network analyzer component 204 initiates a scan of a frequency resource, and if the communication component 208 subsequently initiates a communication using the frequency resource or another frequency resource, in some instances, the communication component 208 can initiate the communication by interrupting the network analyzer component 204. In some instances, other prioritization schemes may be used, and the communication component 208 can have any relative or absolute priority level.

The location component 210 can include functionality to determine a location of the user equipment 200. In some instances, the location component 210 can determine a location based at least in part on GPS location data, base station identity, WI-FI access point identity (WI-FI location), or a combination of location sources. In some embodiments, a location can include a mobile network code (MNC) and a mobile country code (MCC) used in combination to uniquely identify a mobile network carrier network. In some embodiments, the location component 210 can determine a base station or cell identity, and/or latitude, longitude, altitude information, and timestamp information. In some instances, the location can be determined in connection with determining one or more metrics associated with a signal, band, or channel. In some instances, the location can be provided to a network device, for example, for aggregation and analysis. In some instances, the location component 210 can determine a location of the user equipment 200 relative to a location of a geofenced location. For example, the location component 210 can receive a geofenced location from a network device.

The power management component 212 can include functionality to determine a status and/or level of a power resource of the user equipment 200. For example, the power management component 212 can determine a remaining battery percentage, remaining charge, used charge, etc. to evaluate resources of the user equipment 200. Further, the power management component 212 can determine that the power resource is above or below a threshold value, for example, to determine whether the remaining amount of energy is sufficient for expected levels of activity. In some instances, a schedule for initiating scanning of frequency resources can be based at least in part on a power resource of the user equipment 200. For example, when a battery level is relatively high (and/or the user equipment 200 is connected to an external source of power) the scanning can be initiated more frequently than when a battery level is relatively low (and/or the user equipment is not connected to external power). Of course, a variety of power management schemes can be used to initiate scanning based at least in part on available power resources.

The reporting component 214 can include functionality to store one or more metrics associated with one or more frequency resources and to send such metrics to a network device. In some instances, the reporting component 214 can send the one or more metrics to a network device as the one or more metrics are generated, captured, or determined. In some instances, the reporting component 214 can aggregate the metrics and send the aggregated metrics to the network device. In some instances, the reporting component 214 can send the metrics at a time of low network congestion (e.g., at night). In some instances, the reporting component 214 can transmit metrics in response to a query from a network device. In some instances, the reporting component 214 can encode the data sent to a network device such that a service provider tracking data usage does not count the data against a quota associated with the user equipment 200.

In some embodiments, the processor(s) 216 is a central processing unit (CPU), a graphics processing unit (GPU), or both CPU and GPU, or other processing unit or component known in the art.

The user equipment 200 also includes additional data storage devices (removable and/or non-removable) such as, for example, magnetic disks, optical disks, or tape. Such additional storage is illustrated in FIG. 2 by removable storage 218 and non-removable storage 220. Tangible computer-readable media can include volatile and non-volatile, removable and non-removable media implemented in any method or technology for storage of information, such as computer readable instructions, data structures, program modules, or other data. Memory 202, removable storage 218 and non-removable storage 220 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the user equipment 200. Any such tangible computer-readable media can be part of the user equipment 200.

In various embodiments, the user equipment 200 can include applications including but are not limited, a web browser application, a video streaming application, an online gaming application, a network analyzer, and the like. During execution on the user equipment 102, each of the applications may be configured to cause the user equipment 102 to initiate data communications with the network device(s) 114 over the network(s) 116.

The user equipment 102 may be configured to communicate over a telecommunications network using any common wireless and/or wired network access technology. Moreover, the user equipment 102 may be configured to run any compatible device operating system (OS), including but not limited to, MICROSOFT WINDOWS MOBILE, GOOGLE ANDROID, APPLE IOS, LINUX MOBILE, as well as any other common mobile device OS.

The user equipment 200 also can include input device(s) 222, such as a keypad, a cursor control, a touch-sensitive display, voice input device, etc., and output device(s) 224 such as a display, speakers, printers, etc. These devices are well known in the art and need not be discussed at length here.

As illustrated in FIG. 2, the user equipment 200 also includes one or more wired or wireless transceiver(s) 226. For example, the transceiver(s) 226 can include a network interface card (NIC), a network adapter, a LAN adapter, or a physical, virtual, or logical address to connect to various network(s) 116, or to the network device(s) 114, for example. To increase throughput when exchanging wireless data, the transceiver(s) 226 can utilize multiple-input/multiple-output (MIMO) technology. The transceiver(s) 226 can comprise any sort of wireless transceivers capable of engaging in wireless, radio frequency (RF) communication. The transceiver(s) 226 can also include other wireless modems, such as a modem for engaging in WI-FI, WIMAX, BLUETOOTH, infrared communication, and the like.

In some instances, the transceiver(s) 226 can correspond to the transceiver(s) 106 of FIG. 1.

Figure 3:
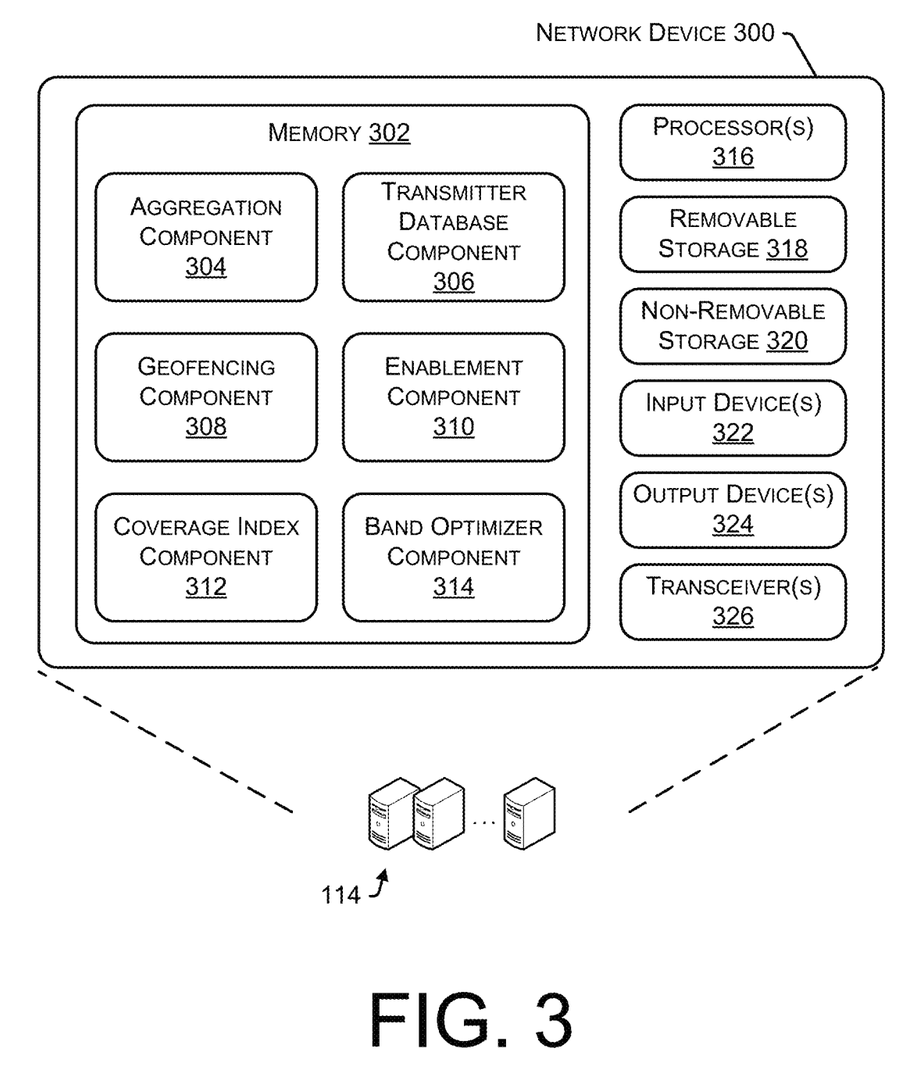
FIG. 3 illustrates an example network device configured to receive network metrics captured by user equipment, in accordance with embodiments of the disclosure.

FIG. 3 illustrates an example network device 300 configured to receive network metrics captured by user equipment, in accordance with embodiments of the disclosure. In some embodiments, the network device 300 can correspond to the network device 114 of FIG. 1. It is to be understood in the context of this disclosure that the network device 300 can be implemented as a single device or as a plurality of devices with components and data distributed among them.

As illustrated, the network device 300 comprises a memory 302 storing an aggregation component 304, a transmitter database component 306, a geofencing component 308, an enablement component 310, a coverage index component 312, and a band optimizer component 314. Also, the network device 300 includes processor(s) 316, a removable storage 318 and non-removable storage 320, input device(s) 322, output device(s) 324, and transceiver(s) 326.

In various embodiments, the memory 302 is volatile (such as RAM), non-volatile (such as ROM, flash memory, etc.) or some combination of the two. The aggregation component 304, the transmitter database component 306, the geofencing component 308, the enablement component 310, the coverage index component 312, and the band optimizer component 314 stored in the memory 302 can comprise methods, threads, processes, applications or any other sort of executable instructions. The aggregation component 304, the transmitter database component 306, the geofencing component 308 the enablement component 310, the coverage index component 312, and the band optimizer component 314 can also include files and databases.

The aggregation component 304 can include functionality to receive one or more metrics determined and/or captured by user equipment, as discussed herein. In some instances, the aggregation component 304 can receive a plurality of metrics and store the metrics in a database. In some instances, the metrics can be indexed by location, time, serving cell ID, user equipment, and the like. In some instances, the aggregation component 304 can perform any statistical analysis on the metrics to determine a variety of signal characteristics. For example, the aggregation component 304 can determine a signal type (e.g., TV, radio, cell phone, etc.) as well as quantitate or qualitative characteristics of the signal.

In some instances, the aggregation component 304 can correspond to the aggregation component 118 of FIG. 1.

The transmitter database component 306 can store available frequency bands with the identifiers and locations of cells, which may be referred to as transmitters, network cells, and/or base stations, in a database. The transmitter database component 306 can assign a new cell a cell identifier (may be referred to as a based station identifier) and the cell identifier may be any uniquely assigned identification code or number assigned to a cell for the transmitter database component 306 to identify the exact cell and may be used to further identify the location of the cell based on information stored on a lookup table or database. The transmitter database component 306 can also store information related to each cell, including the handover rule with handover conditions and network metric thresholds associated with the cell, the frequency band or range, the transmission level of each antenna, in the database. Further, the transmitter database component 306 can receive location data, cell ID, and/or metrics associated with a signal to determine which transmitter corresponds to the metrics. In examples, the transmitter database component 306 may provide a portion of the stored information by populating a corresponding map location with the stored information as map data to allow visualization of the network location and coverage. The map data can also be populated by other components (e.g., the geofencing component 308 may add grid lines) to provide additional information and visualization. In additional examples, the transmitter database component 306 can populate map data with types of location features that may affect signal transmission. The types of location features may include an altitude, a user density, an urban region, a suburban region, a rural region, or a type of building. The types of location features may be determined by engineers and/or service personnel during setup and/or maintenance of the base stations. Additionally, the types of location features may be updated manually by a service personnel or automatically by map data acquired from other map databases. For instance, during initial setup of a base station, the service personnel may categorize the location feature as "suburban region" because location is a suburban region surrounded by large parking lots. However, over time, large mixed used buildings and malls may develop, and the location feature should be updated to reflect "large malls."

The geofencing component 308 can include functionality to determine area or regions of interest in which the band dominance analysis should be performed. The geofencing component 308 can determine a network coverage area with multiple cells where metrics are to be determined. Additionally, the geofencing component 308 can determine subdivided areas (e.g., grid dimension) within the network coverage area where metrics are to be determined. For example, the geofencing component 308 can divide a region of interest into grids (e.g., 100×100 m, 1×1 mile, 300×300 ft, etc.) to aid in determining and visualizing band dominance per grid. In some instances, the geofencing component 308 can determine areas where network resources (e.g., base stations) are to be adjusted (e.g., reduced or increased band dominance) to confirm adjusted signal in that area.

The enablement component 310 can include functionality to enable a network analyzer component for individual user equipment. For example, the enablement component 310 can send invitations to various user equipment to determine if users of the user equipment wish to activate the network analyzer, as discussed herein. In some instances, the enablement component 310 can enable the network analyzer component for individual user equipment based at least in part on characteristics of the user component, such as whether an antenna of the user equipment is configured to receive signals associated with particular frequency resources.

The coverage index component 312 can include functionality to analyze the aggregated metrics to determine the available bands for a particular location and the coverage index for each available band, as discussed herein. For instance, the coverage index component 312 may perform analysis including determining a coverage index for a first network band based on a percentage of call count using the first network band relative to total calls for the particular location. The coverage index for the first network band may then be compared to a second coverage index for a different second network band at the same location to determine a band dominancy. Based on the band dominancy, the network device may determine a coverage index threshold for a network cell in the particular location and send a command to remotely adjust the threshold for the network cell.

The coverage index component 312 can use the aggregated metrics to determine the total number of calls made by user devices in a coverage area and the coverage index based on the percentage of calls connected using each available band. In some instances, the aggregated metrics can be indexed by cell identifier (may also be referred to as "base station identifier"), the location area, the network band, the number of calls served by the network band in the area, the total number of calls served in the area, and the like.

For example, at an example location A, a cell 1 is serving 200 calls, with 170 calls connected using band A and 22 calls connected using band B. The coverage index for band A is 89% and the coverage index for band B is 11%. Accordingly, band A is the dominant band for the example location A. If the coverage index component 312 determines that the coverage index for band B is low relative to the bandwidth available, the coverage index component 312 may determine to adjust the threshold to handover to band B. For instance, the network device 300 may remotely increase the quality threshold for cell 1 such that a user equipment connected through band A would switch to band B even though the signal quality of band A is high relative to the default signal quality threshold. Although the coverage index is expressed at a percentage here, it can be any numeric expression, including fraction or decimal.

In some instances, coverage index component 312 can perform any statistical analysis on the metrics and/or coverage index to evaluate band dominancy within an area. In some instances, the coverage index component 312 can generate reports and visualization based on the statistical analysis to present evaluation results and provide recommendations.

Figure 4:
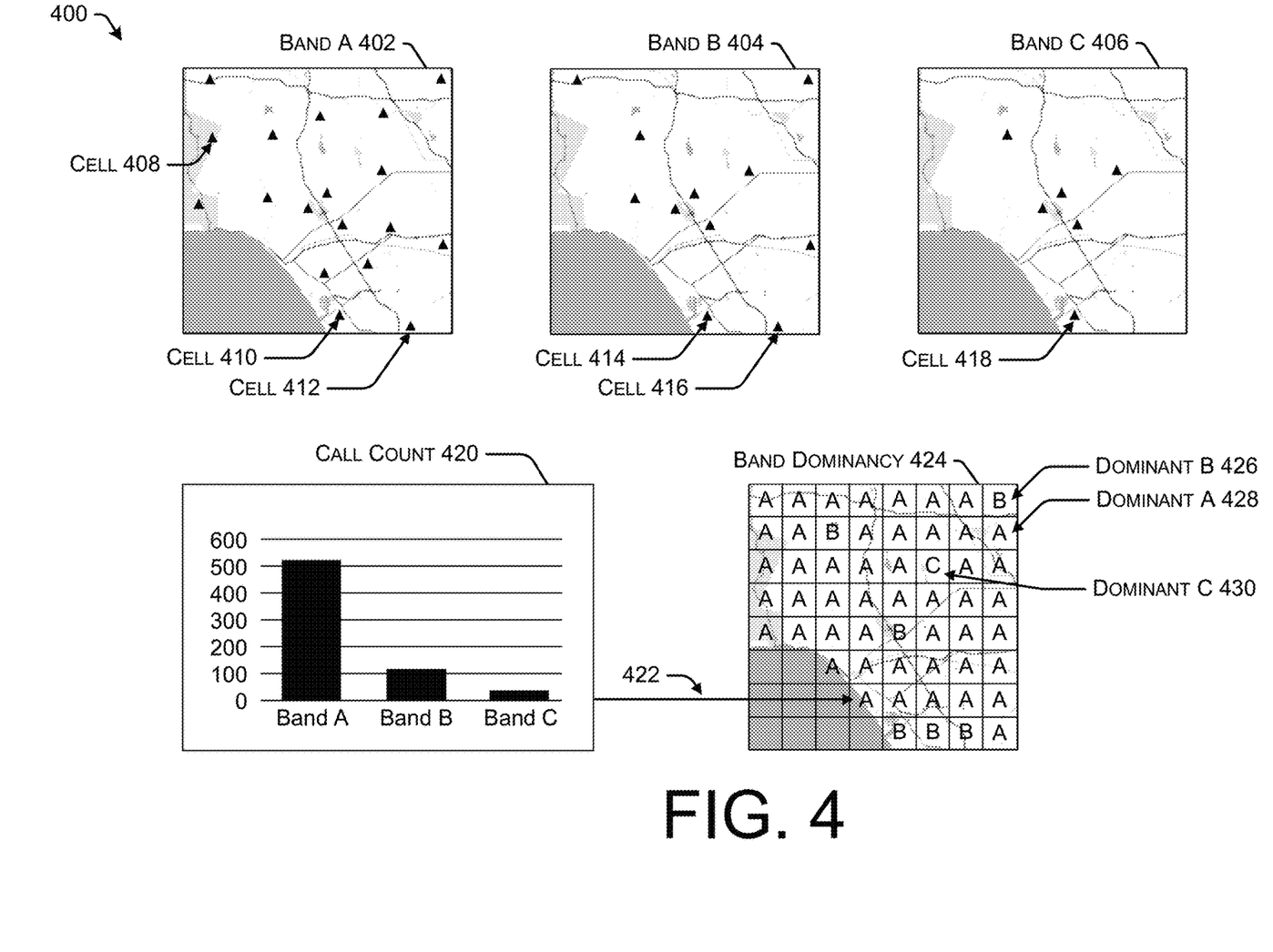
FIG. 4 illustrates an example band dominance analysis including example visualization of network data captured using a network analyzer, as discussed herein.

In some instances, the coverage index component 312 can generate visualization for network coverage map and perform band dominance analysis for network cells within a location area or grid, as described herein with respect to FIG. 4.

The band optimizer component 314 may determine to adjust band utilization to reduce interference and to ensure balanced implementation of network topologies. In various examples, the band optimizer component 314 can send messages, based on the coverage index and band dominancy, to a network device at a base station to automatically adjust one or more parameters for a handover rule to optimize band priority. The one or more parameters for the handover rule of a base station may include available bands, weight for individual network metrics, and threshold values to trigger switching between the available bands. For instance, if the network defaults to using band A but determines to increase priority on the use of band B, the network may decrease a first threshold needed to switch from a current band to band B and increase a second threshold needed to switch from band B to different band. In this present example, the threshold values are adjusted to increase the likelihood of the base station switching a user equipment over to band B and decreasing the likelihood of the base station switching the user equipment back to band A. In additional examples, the network may adjust the weight for network metrics. For instance, the network may increase the weight of a reference signal received quality (RSRQ) or decrease the weight of the reference signal received power (RSRP) when determining handover for a user equipment. In some examples, the band optimizer component 314 can continuously monitor the network metrics related to the cell location to determine if additional adjustment on the one or more parameters is needed including increasing or decreasing network metric thresholds. The band optimizer component 314 can send additional messages, based on determining over or under correcting the band coverage, to the network device at the base station again to automatically adjust the band priority.

In some examples, the band optimizer component 314 can evaluate band dominancy for a coverage area and to determine if the amount of signal interference is degrading user experience. The band optimizer component 314 may determine network metric thresholds to adjust band utilization to reduce interference and to ensure balanced implementation of network topologies. In additional examples, the band optimizer component 314 may determine the network metric thresholds for handover based partly on the reference signal received power (RSRP), the reference signal received quality (RSRQ), and/or the signal-to-interference-plus-noise ratio (SINR). In examples, the band optimizer component 314 can generate recommendations to optimize band utilization, which may include changing the network metric thresholds for a base station in an area to rebalance band coverage, as discussed herein. In various examples, the band optimizer component 314 may determine to adjust the network metric thresholds on a cluster of cells in an area. For instance, the band optimizer component 314 may send messages to the network devices of multiple base stations in the cluster of cells to change the parameters for the handover rule.

In additional examples, the band optimizer component 314 may determine to temporarily increase the use of certain bands during specific time interval when a larger than usual influx of user is expected (e.g., for cells near a stadium during a ball game, cells along the path of a planned parade, etc.). In additional examples, the band optimizer component 314 may learn patterns of increased user for particular time frame in a particular area (e.g., morning and afternoon traffic near the interstate) based on continuously monitoring the network metrics and may temporarily adjust the network metric thresholds in response to the learned patterns. In some examples, the band optimizer component 314 for a network device 300 located at a base station may continuously monitor utilization rate for each available band and may prioritize using a particular band based on the utilization rate being less than a coverage threshold.

In some embodiments, the processor(s) 316 is a central processing unit (CPU), a graphics processing unit (GPU), or both CPU and GPU, or other processing unit or component known in the art.

The network device 300 also includes additional data storage devices (removable and/or non-removable) such as, for example, magnetic disks, optical disks, or tape. Such additional storage is illustrated in FIG. 3 by removable storage 318 and non-removable storage 320. Tangible computer-readable media can include volatile and nonvolatile, removable and non-removable media implemented in any method or technology for storage of information, such as computer readable instructions, data structures, program modules, or other data. Memory 302, removable storage 318 and non-removable storage 320 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information, and which can be accessed by the network device 300. Any such tangible computer-readable media can be part of the network device 300.

The network device 300 can include input device(s) 322, such as a keypad, a cursor control, a touch-sensitive display, etc. Also, the network device 300 can include output device(s) 324, such as a display, speakers, etc. These devices are well known in the art and need not be discussed at length here.

As illustrated in FIG. 3, the network device 300 can include one or more wired or wireless transceiver(s) 326. In some wireless embodiments, to increase throughput, the transceiver(s) 326 can utilize multiple-input/multiple-output (MIMO) technology. The transceiver(s) 326 can be any sort of wireless transceivers capable of engaging in wireless, radio frequency (RF) communication. The transceiver(s) 326 can also include other wireless modems, such as a modem for engaging in WI-FI, WIMAX, BLUETOOTH, infrared communication, or the like.

FIG. 4 illustrates an example band dominance analysis 400 including example visualization of network data captured using a network analyzer, as discussed herein. In some instances, the example band dominance analysis 400 can represent network data as example visualization including band A 402, band B 404, band C 406, call count 420, and band dominancy 424.

In some instances, the example band dominance analysis 400 can represent data as example visualization indicating cell locations in a region of interest for individual bands including example cell maps of band A 402, band B 404, and band C 406. Each example cell map indicates locations of cell towers that are operating on a particular frequency band including, but is not limited to, an LTE Band 12 (e.g., a 700 MHz band), an LTE Band 4 (e.g., 1700 MHz band and/or a 2100 MHz band), an LTE Band 2 (e.g., a 1900 MHz band), an LTE Band 66 (e.g., a 1700 MHz band and/or a 2100 MHz extended band), a NR Band n71 (e.g., a 600 MHz band), a UMTS Band 4 (e.g., 1700 MHz band and/or a 2100 MHz band), UMTS Band 2 (e.g., a 1900 MHz band), GSM Band 2 (e.g., a 1900 MHz band), and the like.

As a non-limiting example, the example cell map of band A 402 includes example cells 408, 410, and 412 all operating on band A (e.g., LTE Band 4 (e.g., 1700 MHz band and/or a 2100 MHz band)). The example cell map of band B 404 may include cells 414 and 416 all operating on band B (e.g., LTE Band 12 (e.g., a 700 MHz band)). The example cell map of band C 406 may include cell 418 operating on band C (e.g., LTE Band 2 (e.g., a 1900 MHz band)). Each cell tower location can support multiple bands although they do not have to. For instance, cells 410, 414, and 418 are all in the same cell tower location while supporting bands A, B, and C, respectively. Cells 412 and 416 are co-located on the same cell tower and support bands A and B. Cell 408 is an example of a cell tower location that supports only one band, band A. In the present example, although only band A operates from cell 408, a user device located near cell 408 may still receive signal from neighboring cell, for example, from band B if it's using LTE Band 12 (e.g., a 700 MHz band) because it is a low frequency signal that can propagate further than the higher frequency signal.

In some instances, the example band dominance analysis 400 can represent call data indicating band dominancy analysis for a region of interest. As described herein, a region of interest can be subdivided into grids (e.g., 100×100 m). The coverage index component 312 can perform band dominancy analysis for each of the grids by locating calls within each grid and counting the calls for each band. For example, the example call count 420 represents an example visualization of call counts for bands A, B, and C for example grid 422. As indicated by the example visualization, band A is the most dominant band with more than 500 calls in the example grid 422. This dominancy is represented visually with "A" in the example band dominancy 424. In instances, the example band dominancy 424 can represent the example visualization of band dominance with band identifiers (e.g., A, B, C) including example dominant B 426, dominant A 428, and dominant C 430. Of course, the example visualizations are not limited to band identifiers, but may include symbols, numbers, or color squares.

As represented by call count 420 and band dominancy 424, which can correspond to aggregated data and/or individual metrics collected by user equipment, as discussed herein. In some instances, the call count 420 can capture different network metrics, such as cell ID, additional bands, grid location, or coverage index, determined by the user equipment. The network metrics can include key metrics captured at the time of a communication and can include: the geographical location (e.g., GPS or WI-FI based location) of the user equipment (including latitude/longitude and location accuracy), a cell identifier of a cell serving the user equipment, RSSI, RSRP, RSRQ, and a signal-to-interference-plus-noise ratio (SINR).

In some instances, the example band dominance analysis 400 can be generated by the coverage index component 312 and band optimizer component 314, as discussed herein. Of course, the example visualizations are not limited to the example band dominance analysis 400.

Figure 5:
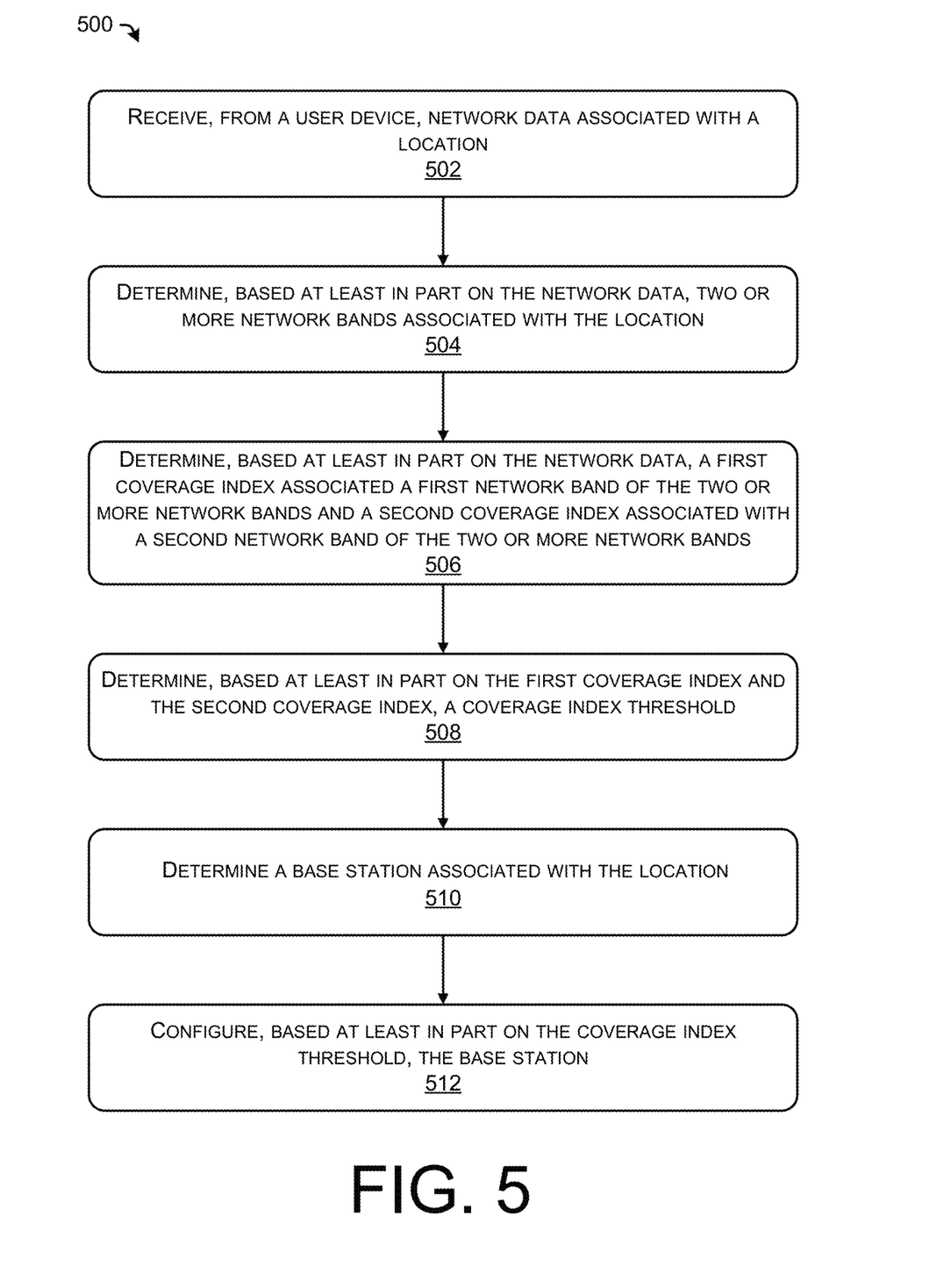
FIG. 5 illustrates an example process for receiving network metrics and determining the coverage index threshold based on aggregated network metrics, as described herein.
Figure 6:
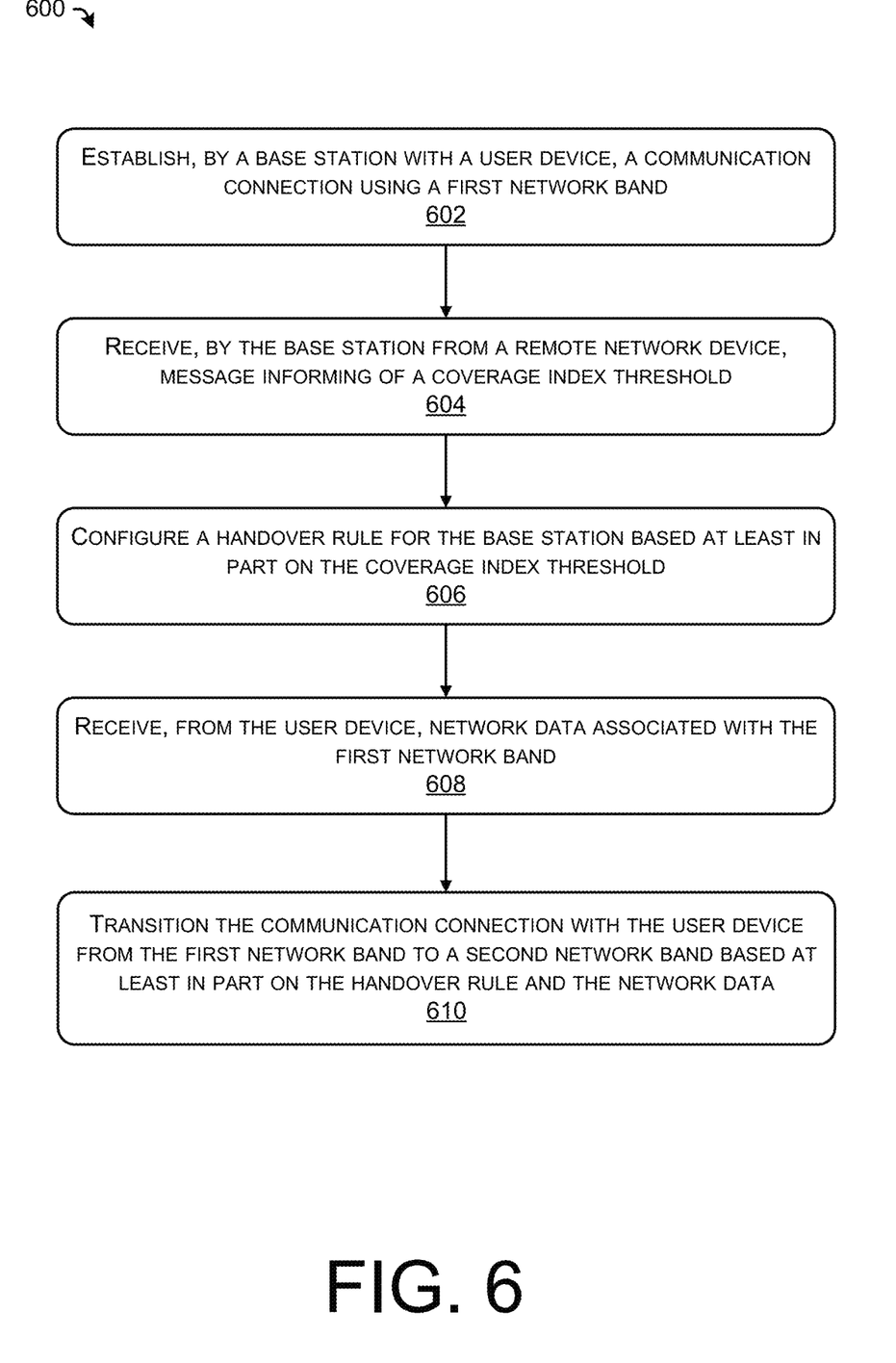
FIG. 6 illustrates an example process for instructing components of a network device at a base station to adjust a coverage index threshold, as described herein.

FIGS. 5 and 6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process 500 for receiving network metrics and determining the coverage index threshold based on aggregated network metrics, as described herein. The example process 500 can be performed by the network device(s) 114 and 300 (or another component), in connection with the user equipment 102 and 200 (or another component), and other components discussed herein. Some or all of the process 500 can be performed by one or more devices, equipment, or components illustrated in FIGS. 1-3, for example.

At operation 502, the process can include receiving, from a user device, network data associated with a location. In some instances, the operation 502 can be performed by the user equipment using the network analyzer component 104 or 204, for example. In some instances, the operation 502 can include one or more metrics associated with a signal received, detected, or otherwise monitored by the user equipment 200. For example, the network analyzer component 204 can determine metrics including but not limited to RSSI, RSRP, RSRQ, SINR, power density, and the like for a specific bandwidth in the frequency domain. The network analyzer component 204 can instruct the operating system component to control software and/or hardware associated with a transceiver of the user equipment to monitor conditions at the user equipment and to provide metrics (e.g., information about location, network environment, call status, etc.) indicative of the conditions to a network server for subsequent analysis. In some instances, information can be associated with the metrics, such as the geographical location of the user equipment (e.g., GPS or Wi-Fi based location), a cell identifier of a cell serving the user equipment, a signal-to-interference-plus-noise ratio (SINR), and the like. In some instances, the information may refer to geolocation information, which may include any information associated with the location, such as an address, the location latitude, the location longitude, the location accuracy, the location altitude, the location identifier, the location area code, and the like. The network analyzer component 204 can send the metrics to a network device to aggregate and analyze the metrics.

At operation 504, the process can include determining, based at least in part on the network data, two or more network bands associated with the location. In some instances, the operation 504 can include functionality to receive one or more metrics determined and/or captured by user equipment, as discussed herein. In some instances, the operation 504 can receive a plurality of metrics and store the metrics in a database. In some instances, the metrics can be indexed by location, time, serving cell ID, user equipment, and the like. In some instances, the operation 504 can include functionality to analyze the aggregated metrics to determine the available bands for a particular location, as discussed herein.

At operation 506, the process can include determining, based at least in part on the network data, a first coverage index associated a first network band of the two or more network bands and a second coverage index associated with a second network band of the two or more network bands. The operation 506 may perform analysis including determining a coverage index for a first network band based on a percentage of call count using the first network band relative to total calls for the particular location.

At operation 508, the process can include determining, based at least in part on the first coverage index and the second coverage index, a coverage index threshold. For example, the operation 508 can include functionality to compare the coverage index for the first network band to a second coverage index for a different second network band at the same location to determine a band dominance. Based on the band dominance, the operation 508 may determine a coverage index threshold for a network cell in the particular location and send a command to remotely adjust the threshold for the network cell.

At operation 510, the process can include determining a base station associated with the location. The operation 510 can receive location data, cell ID, and/or metrics associated with a signal to determine which transmitter corresponds to the metrics. In some instances, the metrics can be indexed by cell identifier (may also be referred to as "base station identifier"), the location area, the network band, the number of calls served by the network band in the area, the total number of calls served in the area, and the like.

At operation 512, the process can include configuring, based at least in part on the coverage index threshold, the base station. The operation 512 can send messages, based on the coverage index threshold, to a network device at a base station to automatically adjust one or more parameters for a handover rule to optimize band priority. The one or more parameters for the handover rule of a base station may include available bands, weight for individual network metrics, and threshold values to trigger switching between the available bands. In additional examples, the operation 512 may adjust the weight for network metrics. For instance, the operation 512 may increase the weight of a reference signal received quality (RSRQ) or decrease the weight of the reference signal received power (RSRP) when determining handover for a user equipment. In some examples, the operation 512 can continuously monitor the network metrics related to the cell location to determine if additional adjustment on the one or more parameters is needed including increasing or decreasing network metric thresholds. The operation 512 can send additional messages, based on determining over or under correcting the band coverage, to the network device at the base station again to automatically adjust the band priority.

FIG. 6 illustrates an example process 600 for instructing components of a network device at a base station to adjust a coverage index threshold, as described herein. The example process 600 can be performed by the network device(s) 114 and 300 (or another component), in connection with the user equipment 102 and 200 (or another component), and other components discussed herein. Some or all of the process 600 can be performed by one or more devices, equipment, or components illustrated in FIGS. 1-3, for example.

At operation 602, the process can include establishing, by a base station with a user device, a communication connection using a first network band. In some instances, the operation 602 can receive a request at a base station from a user device to establish communication connection. In some instances, the first network band can be a default or higher priority band for the user device to connect to.

At operation 604, the process can include receiving, by the base station from a remote network device, message informing of a coverage index threshold. In some instances, based on the band dominancy, the network device may determine a coverage index threshold for a network cell in the particular location and send a command to remotely adjust the threshold for the network cell.

At operation 606, the process can include configuring a handover rule for the base station based at least in part on the coverage index threshold. In some instances, the operation 606 can be performed by a network device at the base station to configure the handover rule. In some instances, the operation 606 may determine to adjust band utilization to reduce interference and to ensure balanced implementation of network topologies. In various examples, the operation 606 can automatically adjust one or more parameters for a handover rule to optimize band priority. The one or more parameters for the handover rule of a base station may include available bands, weight for individual network metrics, and threshold values to trigger switching between the available bands.

At operation 608, the process can include receiving, from the user device, network data associated with the first network band. In some instances, the operation 608 can continuously monitor the network metrics related to the base station to determine if additional adjustment on the one or more parameters is needed including increasing or decreasing network metric thresholds. In some examples, the operation 608 may continuous monitor utilization rate for each available band and may prioritize using a particular band based on the utilization rate being less than the coverage index threshold.

At operation 610, the process can include transitioning the communication connection with the user device from the first network band to a second network band based at least in part on the handover rule and the network data. The operation 610 can configure one or more parameters for a handover rule of a base station and may trigger switching between the available bands. For instance, if the network defaults to using band A but determines to increase priority on the use of band B, the network may decrease a first threshold needed to switch from a current band to band B and increase a second threshold needed to switch from band B to different band. In this present example, the threshold values are adjusted to increase the likelihood of the base station switching a user equipment over to band B and decreasing the likelihood of the base station switching the user equipment back to band A. In additional examples, the operation 610 may adjust the weight for network metrics. For instance, the operation 610 may increase the weight of a reference signal received quality (RSRQ) or decrease the weight of the reference signal received power (RSRP) when determining handover for a user equipment. In some examples, the operation 610 can continuously monitor the network metrics related to the base station to determine if additional adjustment on the one or more parameters is needed including increasing or decreasing network metric thresholds.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   establishing, by a base station with a user device, a communication connection using a first network band, the base station configured to use the first network band and a second network band for communication;
   receiving, by the base station from a remote network device, a message informing of a coverage index threshold;
   configuring a handover rule for the base station based at least in part on the coverage index threshold;
   receiving, from the user device, network data associated with the first network band; and
   transitioning the communication connection with the user device from the first network band to the second network band based at least in part on the handover rule and the network data.

2. The method of claim 1, wherein the handover rule includes at least one of a reference signal received power (RSRP) threshold, a reference signal received quality (RSRQ) threshold, or an RSRP/RSRQ threshold, and the transitioning the communication connection further comprises at least one of:
   determining, based at least in part on the network data, that an RSRP associated with the first network band is less than the RSRP threshold;
   determining, based at least in part on the network data, that an RSRQ associated with the first network band is less than the RSRQ threshold; or
   determining, based at least in part on the network data, that the RSRP and the RSRQ associated with the first network band is less than the RSRP/RSRQ threshold.

3. The method of claim 1, further comprising:
   determining a first utilization rate associated with the first network band and a second utilization rate associated with the second network band.

4. The method of claim 3, further comprising:
   receiving, from a second user device, a request to initiate a communication connection;
   determining the first utilization rate is less than the coverage index threshold; and
   establishing, with the second user device, a second communication connection using the first network band.

5. The method of claim 3, further comprising:
   receiving, from a second user device, a request to initiate a communication connection;
   determining the first utilization rate is greater than the coverage index threshold; and
   establishing, with the second user device, a second communication connection using the second network band.

6. The method of claim 1, further comprising:
   receiving, from the remote network device, a second message informing of a second handover rule and a time interval for the second handover rule;
   storing the handover rule as a default handover rule;
   configuring the base station to use the second handover rule; and
   configuring the base station to use the default handover rule after the time interval has lapsed.

7. The method of claim 1, further comprising:
   receiving, from the remote network device, a second message informing of a second handover rule and a timed schedule for the second handover rule, the timed schedule including a start time and a finish time;
   storing the handover rule as a default handover rule;
   determining a current time is at the start time;
   configuring the base station to use the second handover rule;
   determining the current time is at the finish time; and
   configuring the base station to use the default handover rule.

8. A base station comprising:
   one or more processors;
   a memory; and
   one or more components stored in the memory and executable by the one or more processors to perform operations comprising:
      establishing a communication connection with a user device using a first network band, the base station configured to use the first network band and a second network band for communication;
      receiving, from a remote network device, a message informing of a coverage index threshold;
      configuring a handover rule for the base station based at least in part on the coverage index threshold;
      receiving, from the user device, network data associated with the first network band; and
      transitioning the communication connection with the user device from the first network band to the second network band based at least in part on the handover rule and the network data.

9. The base station of claim 8, wherein the handover rule includes at least one of a reference signal received power (RSRP) threshold, a reference signal received quality (RSRQ) threshold, or an RSRP/RSRQ threshold, and the transitioning the communication connection further comprises at least one of:
   determining, based at least in part on the network data, that an RSRP associated with the first network band is less than the RSRP threshold;
   determining, based at least in part on the network data, that an RSRQ associated with the first network band is less than the RSRQ threshold; or
   determining, based at least in part on the network data, that the RSRP and the RSRQ associated with the first network band is less than the RSRP/RSRQ threshold.

10. The base station of claim 8, wherein the operations further comprise:
    determining a first utilization rate associated with the first network band and a second utilization rate associated with the second network band.

11. The base station of claim 10, wherein the operations further comprise:
    receiving, from a second user device, a request to initiate a communication connection;
    determining the first utilization rate is less than the coverage index threshold; and
    establishing, with the second user device, a second communication connection using the first network band.

12. The base station of claim 10, wherein the operations further comprise:

receiving, from a second user device, a request to initiate a communication connection;
determining the first utilization rate is greater than the coverage index threshold; and
establishing, with the second user device, a second communication connection using the second network band.

13. The base station of claim 8, wherein the operations further comprise:
receiving, from the remote network device, a second message informing of a second handover rule and a time interval for the second handover rule;
storing the handover rule as a default handover rule;
configuring the base station to use the second handover rule; and
configuring the base station to use the default handover rule after the time interval has lapsed.

14. The base station of claim 8, wherein the operations further comprise:
receiving, from the remote network device, a second message informing of a second handover rule and a timed schedule for the second handover rule, the timed schedule including a start time and a finish time;
storing the handover rule as a default handover rule;
determining a current time is at the start time;
configuring the base station to use the second handover rule;
determining the current time is at the finish time; and
configuring the base station to use the default handover rule.

15. A system comprising:
a user device;
a remote network device; and
a base station comprising one or more processors and a memory, wherein the memory stores one or more components executable by the one or more processors to perform operations comprising:
establishing a communication connection with the user device using a first network band, the base station configured to use the first network band and a second network band for communication;
receiving, from the remote network device, a message informing of a coverage index threshold;
configuring a handover rule for the base station based at least in part on the coverage index threshold;
receiving, from the user device, network data associated with the first network band; and
transitioning the communication connection with the user device from the first network band to the second network band based at least in part on the handover rule and the network data.

16. The system of claim 15, wherein the operations further comprise:
determining a first utilization rate associated with the first network band and a second utilization rate associated with the second network band.

17. The system of claim 16, wherein the operations further comprise:
receiving, from a second user device, a request to initiate a communication connection;
determining the first utilization rate is less than the coverage index threshold; and
establishing, with the second user device, a second communication connection using the first network band.

18. The system of claim 16, wherein the operations further comprise:
receiving, from a second user device, a request to initiate a communication connection;
determining the first utilization rate is greater than the coverage index threshold; and
establishing, with the second user device, a second communication connection using the second network band.

19. The system of claim 15, wherein the operations further comprise:
receiving, from the remote network device, a second message informing of a second handover rule and a time interval for the second handover rule;
storing the handover rule as a default handover rule;
configuring the base station to use the second handover rule; and
configuring the base station to use the default handover rule after the time interval has lapsed.

20. The system of claim 15, wherein the operations further comprise:
receiving, from the remote network device, a second message informing of a second handover rule and a timed schedule for the second handover rule, the timed schedule including a start time and a finish time;
storing the handover rule as a default handover rule;
determining a current time is at the start time;
configuring the base station to use the second handover rule;
determining the current time is at the finish time; and
configuring the base station to use the default handover rule.

* * * * *